Figure 1:
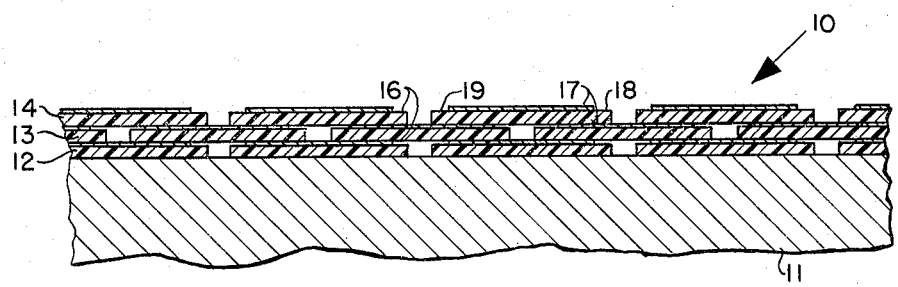

United States Patent Office 3,217,094
Patented Nov. 9, 1965

3,217,094
POLYCARBONATE CABLE
Victor F. Volk, Yonkers, N.Y., assignor, by mesne assignments, to Anaconda Wire and Cable Company, a corporation of Delaware
Filed Dec. 24, 1962, Ser. No. 246,706
6 Claims. (Cl. 174—120)

My invention relates to electrical insulation and particularly to insulation built up of layers of polycarbonate film material.

In an application of Thompson et al., Serial Number 68,534, now Patent 3,105,872, assigned to the assignee of the instant invention, it was suggested that polycarbonate film material offered certain advantages as an insulation for high-voltage power cables. These advantages include, among others, a low power factor at cable operation temperatures, high tensile strength, high softening point, and insolubility in cable oils. A disadvantage of polycarbonate film material was its high coefficient of friction upon itself. As a result of the high frictional resistance to sliding of polycarbonate film, thick sections built up of layers of such films tend to be rigid and inflexible. Since thick walls of insulation are required for high voltages and since electric cables require at least enough flexibility to be taken upon cable reels, means of overcoming the rigidity of insulating walls comprised of layers of polycarbonate film material are a useful contribution to the art. I have discovered that if a fine metallic coating is deposited on the surface of a polycarbonate film tape, there is a surprising reduction of the coefficient of friction. Even more surprisingly—I have found that the metal deposit necessary for this reduction in frictional resistance can be so thin, less than a hundredth of a mil, as to have no noticeable effect on the apparent roughness of the film surface, and that the deposit need only be applied to one of the facing surfaces to effect a most significant reduction in the frictional resistance between layers. It is an important advantage of my invention that such extremely thin layers of aluminum will effect the desired reduction in frictional resistance because the thin layers have low electrical conductance and will not carry enough current to cause a cable fault in the event of a short circuit between layers of dielectric in the cable insulation.

I have invented a flexible wall of electrical insulation comprising a plurality of layers of polycarbonate tapes, metallic films such as vacuum deposited aluminum coating the tapes, the films in a preferred embodiment being not substantially greater than 0.01 mil in thickness, whereby the frictional resistance between layers is substantially reduced below the frictional resistance between polycarbonate surfaces in the absence of the film.

I have further invented an electric cable comprising a conductor and the insulation hereinabove described surrounding the conductor.

A more thorough understanding of my invention may be gained from a study of the appended drawing.

In the drawing:

FIGURE 1 presents a lengthwise partial sectional view of an insulated cable showing metal to polycarbonate interfaces.

Figure 2:
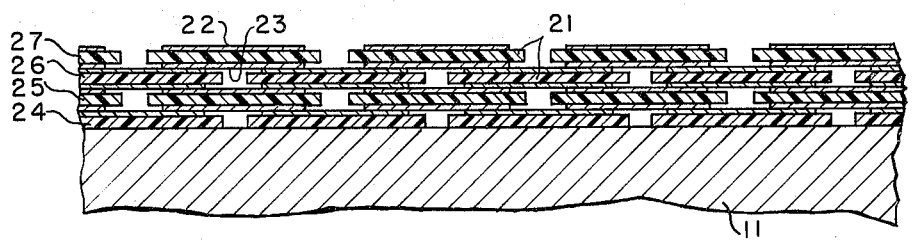

FIGURE 2 presents a lengthwise partial section of an insulated cable showing metal-to-metal polycarbonate interfaces.

It will be understood that the thicknesses shown in FIGURES 1 and 2 have been greatly exaggerated for the sake of clarity.

Referring to FIGURE 1, a cable indicated generally by the numeral 10 has a conductor 11 insulated by a plurality of layers 12, 13, 14 of spirally applied polycarbonate tapes 16. Each of the tapes 16 has an aluminum coating 17 on one surface. The aluminum coating 17 is not so wide as the tape 16 so that uncoated borders 18, 19 of insulating material remain to prevent any tendency of the conducting metal to reduce the dielectric strength between layers. A full discussion of tape insulations with conducting coatings is given in my copending application, Serial No. 862,572, filed December 29, 1959, now Patent No. 3,090,825. From a consideration of FIGURE 1 it will be seen that the contacting surfaces between layers of insulation are between aluminum and polycarbonate. Whereas in the absence of the metal coatings 17 the contacts would be between polycarbonate and polycarbonate.

When the cable 10 is paid from the taping machine on which the layers of insulation 12, 13, 14 have been applied it will be understood that the thickness of insulation may comprise in excess of 50 layers, of which only 3 layers have been shown in the drawing for the sake of clarity. In passing onto a reel the conductor will be bent lengthwise and the layers of insulation will slide in such a manner that the tapes in the layer 14 will spread apart more than the tapes in the layer 13 and in so doing the tapes in the layer 14 will, perforce, slide on the tapes in the layer 13. The coefficient of friction between layers thus becomes a critical matter and I have discovered that the metal layers 17 have surprisingly reduced the frictional resistance between layers.

In FIGURE 2 polycarbonate tapes 21 are coated with metal deposits 22, 23 on both surfaces with the result that the contacts between layers 24, 25, 26, 27 are metal to metal contacts rather than metal to polycarbonate contacts. I have found that this metal to metal coefficient of friction is surprisingly low having a value in the order of 0.22 The unexpected nature of this discovery will be better realized when it is considered that the coefficient of friction of aluminum on aluminum itself is known to be about 1.9 (p. 2183, Handbook of Physics and Chemistry, 43rd Edition, Chemical Rubber Publishing Co.) and the coefficient of friction of polycarbonate on itself exceeds 0.5 (see Example 2).

I prefer that the metal deposits 17 and 22 should be aluminum although I do not wish to be limited to this metal and I prefer that the deposit should be made by the vacuum technique which is known to the art and does not constitute a novel feature of this invention. This means of coating my tapes lends itself to the deposition of very thin layers. The deposits of metal suitable for the practice of my invention are preferably less than 0.01 mil thick. Deposits so thin that they are impossible to measure by means generally available in a metal shop, so thin, in fact that, they are readily seen through, have a surprising effect in reducing the coefficient of friction between polycarbonate surfaces as will hereinafter be shown in detail.

*Example 1*

Polycarbonate tape 1 mil thick and 1⅜ inches wide was coated on one surface with a vacuum deposited coating of aluminum having a thickness of 250–300 Angstroms as determined by light transmittance measurements. The tapes were loaded as indicated over a 1×0.75 inch area and the coefficient of friction determined, metal to metal, as follows.

| Applied weight, grams: | Coefficient of friction |
|---|---|
| 500 | 0.22 |
| 700 | 0.20 |
| 800 | 0.23 |
| 1000 | 0.22 |

Example 2

The tapes of Example 1 were tested polycarbonate to polycarbonate with the following results.

| Applied weight, grams: | Coefficient of friction |
|---|---|
| 500 | 0.50 |
| 700 | 0.57 |

Example 3

The tapes of Example 1 were tested metal to polycarbonate with the following results.

| Applied weight, grams: | Coefficient of friction |
|---|---|
| 500 | 0.26 |
| 700 | 0.21 |
| 800 | 0.24 |
| 1000 | 0.25 |

The tests of Examples 1–3 were performed on tapes free from cable oil. When similar tests were performed on tapes where the surfaces had been wetted with cable oil the coefficient of friction was higher for the metallized surfaces and lower for the polycarbonate to polycarbonate surface.

Example 4

The tapes of Example 1 were wetted with cable oil and the coefficient of friction determined as follows, metal to metal:

| Applied weight, grams: | Coefficient of friction |
|---|---|
| 500 | 0.38 |
| 700 | 0.33 |
| 800 | 0.33 |
| 1000 | 0.32 |

Example 5

The tapes were measured as per Example 4 but metal to polycarbonate, as follows.

| Applied weight, grams: | Coefficient of friction |
|---|---|
| 500 | 0.32 |
| 700 | 0.37 |
| 800 | 0.35 |
| 1000 | 0.36 |

Example 6

The tapes were measured as per Example 4 but polycarbonate to polycarbonate, as follows.

| Applied weight, grams: | Coefficient of friction |
|---|---|
| 500 | 0.32 |
| 700 | 0.39 |
| 800 | 0.37 |

From the examples it will be evident that I have invented a thick wall of insulation built of layers of polycarbonate film material but still retaining a desired degree of flexibility. For my invention I desire an award of Letters Patent.

I claim:

1. A thick, flexible wall of electrical insulation comprising:
   (A) a large plurality of layers of polycarbonate tapes,
   (B) vacuum deposited metallic film coating said tapes,
      (a) said film being from about 250 Angstroms to 0.01 mil in thickness, and having low electrical conductance due to its extreme thinness,
      (b) said metallic film substantially reducing the frictional resistance between said layers.
2. The wall of claim 1 wherein said film is aluminum.
3. An electric cable comprising:
   (A) a conductor,
   (B) a large plurality of layers of polycarbonate tapes surrounding said conductor as electrical insulation therefor, and
   (C) metallic film coating said tapes,
      (a) said film being from about 250 Angstroms to 0.01 mil in thickness and having low electrical conductance due to its extreme thinness.
4. The cable of claim 3 wherein said film is aluminum.
5. An electric cable comprising:
   (A) a conductor,
   (B) a large plurality of layers of polycarbonate tapes surrounding said conductor as electrical insulation therefor, and
   (C) vacuum deposited metallic film coating said tapes,
      (a) said film being from about 250 Angstroms to 0.01 mil in thickness and having low electrical conductance due to its extreme thinness.
6. The cable of claim 5 wherein said film is aluminum.

References Cited by the Examiner

UNITED STATES PATENTS

| 2,260,845 | 10/41 | Urmston | 174—105 |
| 2,315,039 | 3/43 | Beede | 174—25 |
| 2,344,501 | 3/44 | Bennett | 174—107 |
| 2,447,168 | 8/48 | Dean et al. | 174—105 |
| 3,105,872 | 10/63 | Thompson et al. | 174—25 X |

FOREIGN PATENTS

| 1,221,586 | 1/60 | France. |
| 832,902 | 4/60 | Great Britain. |

JOHN F. BURNS, *Primary Examiner.*

JOHN P. WILDMAN, *Examiner.*